Patented May 16, 1939

2,158,530

UNITED STATES PATENT OFFICE 2,158,530

THERMOPLASTIC DERIVATIVES OF RUBBER

Ira Williams, Woodstown, N. J., assignor to E. I. du Pont de Nemours & Company, Wilmington, Del., a corporation of Delaware No Drawing. Application November 5, 1937, Serial No. 172,935

23 Claims. (Cl. 260—108)

This invention relates to derivatives of rubber and more particularly to thermoplastic conversion products and to methods for their production.

It has long been known that rubber can be caused to undergo reactions which result in the formation of less saturated "rubber isomers", many of which are thermoplastic. Sulfuric acid, sulfonic acids and salts, such as stannic and ferric chlorides and chlorstannic acid, have been employed as isomerizing agents. The preparation of products of this type are described by Fisher in Patents 1,668,236 and 1,668,237. The processes of these patents produce soft to hard dark colored products which appear to be insoluble in benzene. Fisher in Patent 1,852,295, has described the production of isomers of rubber by treating the rubber with large amounts of certain isomerizing agents in the presence of phenols as catalysts. In Patent 1,852,346, Fisher describes the production of rubber isomers by treating the rubber in solution with dilute isomerizing agents in the presence of phenols as catalysts. When products were prepared in accordance with these patents, such products were rubbery to hard materials which appeared to be substantially insoluble in benzene, swelling in the benzene, and some forming viscous dispersions in the benzene only with vigorous mechanical stirring.

T. F. Ford, in Patent 2,024,987, describes the production of a similar product by heating a mixture of rubber, an aldehyde, a phenol and an isomerizing agent. The resulting products are soluble in benzene, are generally hard at room temperatures but rubbery at 75° C. Otherwise, these products have substantially the same properties as the products obtained by Fisher in the patents above referred to.

Such isomerizing agents employed in the prior art, even when employed in the presence of phenols as catalysts, have been slow to act, requiring long periods of time on the order of 20 hours for effectuating the reaction. The resulting products contained large amounts of isomerizing agents and other products which required difficult and expensive purification processes. These products of the prior art have the characteristic of adhering to rubber and are used to bind rubber to other materials. For example, when soft unvulcanized rubber containing vulcanizing ingredients is pressed against the rubber isomers of the prior art and heated to vulcanize the rubber and then cooled, the rubber becomes firmly vulcanized to the rubber isomer. Generally, they are opaque and not homogeneous.

It is an object of the present invention to provide a class of thermoplastic rubber derivatives which are relatively pure, and which may be employed as produced without further purification. Another object is to provide a method for producing thermoplastic rubber derivatives in relatively pure form in a simple and economical manner requiring a minimum of time. A further object is to provide new thermoplastic rubber derivatives not known heretofore which do not adhere to rubber, and which are new and useful compositions of matter. A still further object is to produce new thermoplastic rubber derivatives free of objectionable impurities, without separating the objectionable impurities, by converting such impurities to unobjectionable useful products in the mass of rubber derivative. Other objects are to provide new compositions of matter and to advance the art. Still other objects will appear hereinafter.

These objects may be accomplished in accordance with my invention which comprises admixing solid unvulcanized rubber with certain phenols and catalysts, and then heating the mixture, whereby a reaction rapidly takes place between the rubber and the phenol converting the rubber to a thermoplastic material which has substantially none of the original properties of the rubber.

The phenols which may be employed in accordance with my invention are the monohydric phenols which are free of substituents other than hydrogen, halogens and hydrocarbon radicals, or in other words, monohydric phenols which may be unsubstituted, may be hydrogenated, or may contain halogens or hydrocarbon radicals or both halogens and hydrocarbon radicals. By a "monohydric phenol" as employed herein, I mean a phenol containing one and only one hydroxyl group on any one aromatic ring. Also, those phenols which have at least one position adjacent to the hydroxyl group unsubstituted, are the most effective, give the best results, and are preferred. Among the phenols which have been found to produce satisfactory products are phenol, p-chlorphenol, o-chlorphenol, m-chlorphenol, p-cresol, o-cresol, m-cresol, 1-hydroxy-3,5-dimethyl benzene, 1-hydroxy-2,4-dimethyl benzene, 1-hydroxy-2,5-dimethyl benzene, p-phenyl phenol, p-p'-dihydroxy diphenyl, aryl tetra hydro b-naphthol, b-naphthol and alpha-naphthol. Of these, the naphthols, and particularly beta-naphthol, appear to be the most satisfactory and constitute the preferred embodiment of my invention.

Such phenols may be incorporated into rubber which may then be heated without producing a noticeable change. However, if a small amount of a catalyst, such as sulfuric acid; halogen sulfonic acids, such as fluor-sulfonic acid and chlor-sulfonic acid; organic sulfonic acids, such as naphthalene-b-sulfonic acid and benzene sulfonic acid; alkyl sulfates, such as dimethyl sulfate and diethyl sulfate; boron trifluoride and dihydroxy fluoboric acid, or mixtures of two or more of them, is added along with a phenol, or to the mixture of rubber and phenol, a strong exothermic reaction will take place when the mixture is heated. Once started, the reaction accelerates under the influence of the heat developed until the reaction is completed. When the reaction is caused to take place on a rubber mill, or other rubber mixing or masticating apparatus, it will usually be complete in less than fifteen minutes. In many cases, the temperature required for starting the reaction will be above the melting point of the reaction product or the heat generated in the reaction will raise the temperature above the melting point of the reaction product so that such product becomes liquid on the mill.

The extent of the change produced depends to a certain extent on the amount of catalyst employed, but to a much greater extent on the amount of the phenolic material. The resulting products are thermoplastics which vary in softening point with the method of production and the materials employed. The softening point will usually be between about 50° C. to about 110° C. The products of the lower softening points are usually soluble in such solvents as benzene, toluene and gasoline. They differ from the previously known "rubber isomers", such as those produced by sulfuric acid alone, by having substantially no tendency to adhere to unvulcanized rubber.

The amount of phenolic material to be employed will depend largely upon the properties desired in the final product. However, at least 5% of the phenolic material based on the weight of the rubber should be used. Preferably, from 10 to 40% of phenolic material based on the rubber should be employed to produce products of the most desirable characteristics. Larger amounts of phenolic material may be used, but without material advantage, and such larger amounts are uneconomical.

The amount of catalyst employed will also vary to some extent with the properties desired in the final product, but to a much greater extent on the amount of the phenolic material. From about 2% to 50% of catalyst, based on the phenol, should be used. The organic derivatives such as the organic sulfonic acids and the alkyl sulfates appear to be less effective and slower acting than the other catalysts, and hence it will generally be found to be preferable to use from about 8% to about 50% of such organic compounds, based on the phenolic material. For best results, it is preferred to use from 20 to 50% of any of the catalysts based on the phenol. Among the catalysts, sulfuric acid is one of the most effective, and, due to its other desirable properties, it will generally be preferred. Also, I have found that the addition of a small amount of an alkyl sulfate, such as diethyl sulfate, to the sulfuric acid will assist in incorporating the sulfuric acid in the rubber. I generally use a mixture comprising about two to three parts of sulfuric acid and about one part of diethyl sulfate.

The temperature at which the reaction starts will vary slightly with the activity of the phenolic material and the activity of the catalyst. It may usually be caused to start at temperatures as low as 80° C. and may be caused to take place at temperatures between about 80° C. and about 200° C. Preferably, I employ temperatures of from about 100 to about 180° C.

In order to more clearly illustrate my invention, the preferred modes of carrying the same into effect and the advantageous results to be obtained thereby, the following examples are given:

*Example 1*

Twelve parts of b-naphthol were incorporated in 30 parts of pale crepe rubber on a rubber mill at a temperature of 45° C. Four parts of 12½% solution of boron trifluoride in ether were then incorporated after which steam was turned through the rolls. A strong reaction set in when the temperature of the mixture had reached about 90° C. and in the course of one minute the mass became so fluid that part dropped from the rolls. This portion was returned to the rolls and milling was continued for 5 minutes. The rolls were then cooled somewhat and the plastic mass was removed as a sheet. When cool, the product was wine colored, brittle and soluble in benzene and gasoline.

*Example 2*

15 parts of b-naphthol were incorporated into 100 parts of rubber and 3 parts of dihydroxy fluoboric acid was added on a cool mill. Steam at 30 pounds pressure was then led into the mill rolls. The mixture reacted rapidly when the temperature had reached about 100° C. Milling was continued for five minutes after which the reaction product was removed. When cool, the product was of a hornlike consistency and soluble in benzene and gasoline.

*Example 3*

40 parts of b-naphthol was incorporated into 100 parts of rubber and portions were treated by milling in different proportions of sulfuric acid. The mill was then heated and the reaction completed on the mill in less than 15 minutes. The reaction products had the following properties. 1% acid gave a transparent light yellow thermoplastic substance of horn-like consistency, a benzene solution of which was pale yellow. 2% acid gave a product of dark straw color which was hard but not brittle at room temperature and which was soluble in benzene. 4% acid gave a soluble, red brown, hard and somewhat brittle thermoplastic which softened at about 80° C.

*Example 4*

A mixture of 100 parts of rubber, 40 parts of phenol and 4 parts of dihydroxy fluoboric acid were mixed and heated on a rubber mill. The reaction was completed in about 15 minutes. The resulting product was a hard benzene soluble product which softened at about 90° C.

*Example 5*

40 parts of various phenols were incorporated into 100 parts of rubber and treated with 4 parts of sulfuric acid. These products reacted on a heated mill in less than 15 minutes to form thermoplastic substances. The speed of reaction was found to decrease in the following order: p-cresol, o-cresol, 1,3,5-xylenol, 1,2,4-xylenol and phenol.

Example 6

Pale crepe was treated with 20% of its weight of a-naphthol and 3% of diethylsulfate. The mill was then heated to induce reaction which was complete in about 10 minutes. The resulting product was a hard, brown, thermoplastic, soluble in benzene and softening at about 60° C.

Example 7

100 parts of pale crepe rubber were treated with 10 parts of b-naphthol and 4 parts of naphthalene b-sulfonic acid followed by a period of milling on a hot mill for 5 to 15 minutes. When cold, the resulting product was brown, horn-like in consistency and soluble in rubber solvents.

Example 8

100 parts of rubber, 20 parts b-naphthol, and 2 parts of fluor-sulfonic acid were mixed on a cold mill. When milled on a heated mill, the reaction was complete in 5 minutes with formation of a benzene soluble thermoplastic material.

Example 9

100 parts of purified balata were treated with 20 parts of b-naphthol and 4 parts of sulfuric acid. The mixture reacted when the mill was heated for 5 to 15 minutes and the resulting product resembled that obtained from rubber.

The above examples are illustrative only. The various homologs and isomers of the phenols heretofore mentioned may be substituted for those in the examples. Also other phenols, such as the anthranols, phenanthrols and the like, and their homologs may be employed. Likewise, mixtures of two or more phenols may be employed. Similarly, other sulfonic acids and alkyl sulfates may be substituted for those shown in the examples.

The order of mixing the ingredients can be varied. Either the phenol or the catalyst may be incorporated first in the rubber, or the phenol and catalyst may be mixed and added to the rubber together.

The manner of heating may also be varied. In most cases, it is advantageous to heat the products as soon as the phenol and catalyst are incorporated by applying steam to the mixing rolls or to the jacket of the mixer, where an internal type mixer is employed. At other times, it may be desirable to carry out the heating process with other equipment.

The chemical structure of the products resulting from this process is not known. While much of the phenolic material may be extracted with suitable solvents such as acetone, alcohol or alkali solutions, I have found it to be impossible to remove all of the phenolic material. The amount of phenolic material which cannot be removed amounts to from about 1 to about 5% by weight, based on the rubber, and this amount of phenolic material appears to be definitely combined chemically with the rubber.

The products obtained in accordance with the procedure so far described have an impact strength similar to the phenol-aldehyde resins. They are transparent homogeneous resinous materials which have no tendency to adhere to either vulcanized or unvulcanized rubber. They are very resistant to acids and alkalies and are readily soluble in benzene without heating or vigorous stirring. Their solutions in benzene, toluene, gasoline or the like may be used as coating materials to produce acid- and alkali-resistant coatings. They may be used as compounding ingredients for rubber to which they impart a hardness similar to that produced by glue or Montan wax. The addition of 25% of rubber to my products produces materials which resemble balata and which form corona-resistant wire insulations which require no vulcanization. My products have also been found to be of value in lithographing inks. Also, they may be employed alone or admixed with other resins for making box toes for shoes and similar articles.

The products obtained in accordance with the above procedure contain substantial amounts of phenol which have not reacted with the rubber. For certain purposes, the presence of such free phenols is objectionable. The removal of the phenol from the rubber derivative is difficult and expensive. I have found that such free phenol may be caused to react with an aldehyde to form products which are not only unobjectionable, but which, in many cases, are desirable and improve the characteristic properties of the product.

Any aldehyde which can be caused to react with the phenol to form a phenol-aldehyde resin may be employed. The choice of the aldehyde, the amount of aldehyde and the conditions of condensation will depend upon the particular operator, the type of resin desired and the properties desired in the final product. An aldehyde which will produce a soft resin will produce a softer product. If it is desired to increase the hardness of the product, it is only necessary to employ an aldehyde and conditions which will produce a harder phenol-aldehyde resin. If a less soluble product is desired, it is only necessary to employ an aldehyde and conditions which will produce a more insoluble phenol-aldehyde resin.

Preferably I employ from about 0.1 to about 4.0 mols of aldehyde based on the free phenol present in the product. Larger or smaller amounts may be employed as desired.

The temperature required to cause the aldehyde to react with the phenol will generally be from about 80 to about 140° C. Temperatures as high as 200° C. may be employed in some cases without damage to the product.

Among the aldehydes which may be employed in accordance with my invention are formaldehyde, furfural, acrolein, butyr-aldehyde and benzaldehyde. The most satisfactory results are obtained with formaldehyde in its various forms. The next most satisfactory results are obtained with furfural and acrolein.

In general, the phenolic bodies which are most desirable, both from the standpoint of producing the original plastic derivative and from ease of reaction with an aldehyde, are phenols having an unsubstituted ortho or para position and naphthols unsubstituted in the 1, 2 or 4 position.

In order to more clearly illustrate this feature of my invention and the preferred modes of carrying the same into effect, the following examples are given:

Example 10

24 pounds of pale crepe rubber were treated on a cool rubber mill with 2.5 pounds of b-naphthol and 1 pound of sulfuric acid. The mill was then heated with steam until a strong reaction took place and a portion of the material when removed from the mill hardened when cooled. The material, without being cooled or removed from the mill, was treated at 120° C. with 8.5 ounces of tri-oxy-methylene (para-formaldehyde). Water was split out rapidly and the plastic material became more firm on the mill. Milling was continued for 10 minutes when the mass was cooled to about 95° C. and removed from the mill in the form of a sheet. The total time required was about two hours. The product was a dark brown thermoplastic material which softened around 90° C.

Example 11

6830 parts of rubber and 683 parts of b-naphthol were mixed in an internal mixer with 42 parts of diethyl sulfate and 126 parts of sulfuric acid. The mixer was then heated with steam until the reaction was complete. 112 parts of tri-oxy-methylene were then added and the mixing continued for 15 minutes at 120° C. The total time was one hour. The resulting product was a brown resinous material which fractured with difficulty when cold. When heated to about 90° C., it became sufficiently plastic to be sheeted or molded. The product was soluble in benzene and gasoline.

Example 12

100 parts of rubber were treated with 30 parts of phenol and 4 parts of dihydroxy-fluoboric acid. The mixture was worked on steam heated rolls until the rubber was converted into a plastic resin. The mass was then treated, without removing from the mill, with 5 parts of tri-oxy-methylene and milling continued at 120° C. until the water formed was removed. The mass hardened sufficiently to mill with difficulty at a temperature of 120° C. The final product was a dark brown resin only slightly soluble in benzene and softening at about 120° C.

Example 13

100 parts of rubber were treated with 40 parts of b-naphthol and one part of boron trifluoride which was added as a 10% solution in ether. The mixture was worked on a steam heated mill until the strong reaction was completed. The temperature was reduced to 90° C. and 15 parts of furfural were incorporated. The product was then baked for six hours at a temperature of 140° C. The resulting product when cold was a hard dark brown resin which was soluble in benzene.

Example 14

100 parts of rubber were treated with 20 parts of b-naphthol and 4 parts of sulfuric acid. The mixture was heated on a rubber mill until the strong reaction was complete. This mixture was then treated, without removing from the mill, with 1.25 parts of piperidine which was sufficient to neutralize the acid contained in the mass. The addition of sufficient basic material was indicated by a change in color from brown to yellow. The mass was then treated with 5 parts of hexa-methylene-tetramine and held at 140° C. for five hours. The resulting product was a dark, hard, brittle resin.

The above examples are merely illustrative. While I have disclosed products obtained with certain aldehydes, it will be readily apparent to those skilled in the art that many other aldehydes and different proportions may be employed. Also the conditions for condensing the aldehyde with the phenol may be widely varied. The variations, which may be made in the aldehyde and the conditions of condensation, will be readily apparent to those skilled in the art since the reaction of phenolic bodies and aldehydes to produce resinous bodies under both acid and alkaline conditions has been widely investigated and the many combinations which will react are known to those skilled in the art.

When a product, such as those obtained in Examples 1 to 9, was treated to remove the free phenol and then treated with tri-oxy-methylene, no noticeable reaction occurred and the properties of the product remain unchanged. This further illustrates the degree to which the rubber has been changed, since unvulcanized rubber, when treated with tri-oxy-methylene in the presence of an acid catalyst, is changed to a product resembling lightly vulcanized rubber, indicating that the tri-oxy-methylene has reacted with the rubber. This is also an indication that the aldehyde, when employed in accordance with my invention, does not react with the phenol-rubber derivatives, but only with the free phenol present in the reaction product. Accordingly, my product is not one produced by the inter-reaction of rubber, a phenol and an aldehyde.

The products of my invention cannot be produced by mixing rubber, phenol, aldehyde and sulfuric acid or other catalyst and then heating the mixture in the manner described by Ford in Patent 2,024,987. A series of experiments were conducted in which such procedure was followed, the different experiments in the series differing only in the proportions of ingredients employed. In every case, the reaction was slow requiring from 8 to 18 hours. A second series of experiments were made at the same time employing the same proportions as in the first series, but withholding the addition of the aldehyde until after the reaction between the rubber and the phenol had been completed, the conditions otherwise being substantially the same. None of the experiments in the first series produced the same products as those obtained by the second series of experiments. In substantially every case the products obtained in accordance with the process of my invention had much higher softening points than the products obtained in the first series of experiments. When the proportions of naphthol and tri-oxy-methylene, employed in the first series, approached the preferred proportions of the present invention, the resulting product showed no thermoplastic properties and was a tough harsh feeling rubber-like crepe.

The products, obtained in accordance with Examples 10 to 14, are thermoplastic resins which are generally soluble in hydrocarbon solvents and chlorinated solvents such as benzene, gasoline and carbon tetrachloride. They are useful for the formation of coating compositions and molded articles, especially when resistance to chemicals such as acids and alkalies is of importance. They are also of value for the production of box toes and such articles and are of special value for such purposes, when employed as one constituent of a blend of waxy and resinous materials to which they impart flexibility and toughness.

While I have disclosed the preferred embodiments of my invention and the preferred modes of carrying the same into effect, it will be readily apparent to those skilled in the art that many variations and modifications may be made therein without departing from the spirit of my invention. Accordingly, the scope of my invention will be limited solely by the appended claims construed as broadly as is permissible in view of the prior art.

I claim:

1. The method which comprises admixing solid unvulcanized rubber, having the normal characteristics of natural rubber, with at least 5% of a monohydric phenol free of substituents other than hydrogen, halogens and hydrocarbon radicals, and with at least one catalyst selected from the group consisting of sulfuric acid, halogen sulfonic acids, organic sulfonic acids, alkyl sulfates, boron trifluoride and dihydroxy fluoboric acid, the amount of the catalyst being from about 2% to about 50% of the phenol, and causing the phenol to react with the rubber to form a thermoplastic material by heating the mixture.

2. The method which comprises admixing solid unvulcanized rubber, having the normal characteristics of natural rubber, with at least 5% of a monohydric phenol free of substituents other than hydrogen, halogens and hydrocarbon radicals and having at least one position adjacent to the hydroxyl group unsubstituted, and with at least one catalyst selected from the group consisting of sulfuric acid, halogen sulfonic acids, organic sulfonic acids, alkyl sulfates, boron trifluoride and dihydroxy fluoboric acid, the amount of the catalyst being from about 2% to about 50% of the phenol, and causing the phenol to react with the rubber to form a thermoplastic material by heating the mixture.

3. The method which comprises admixing solid unvulcanized rubber, having the normal characteristics of natural rubber, with at least 5% of a monohydric phenol free of substituents other than hydrocarbon radicals and having at least one position adjacent to the hydroxyl group unsubstituted, and with at least one catalyst selected from the group consisting of sulfuric acid, halogen sulfonic acids, organic sulfonic acids, alkyl sulfates, boron trifluoride and dihydroxy fluoboric acid, the amount of the catalyst being from about 2% to about 50% of the phenol, and causing the phenol to react with the rubber to form a thermoplastic material by heating the mixture.

4. The method which comprises admixing solid unvulcanized rubber, having the normal characteristics of natural rubber, with at least 5% of an unsubstituted monohydric naphthol and with at least one catalyst selected from the group consisting of sulfuric acid, halogen sulfonic acids, organic sulfonic acids, alkyl sulfates, boron trifluoride and dihydroxy fluoboric acids, the amount of the catalyst being from about 2% to about 50% of the naphthol, and causing the naphthol to react with the rubber to form a thermoplastic material by heating the mixture.

5. The method which comprises admixing solid unvulcanized rubber, having the normal characteristics of natural rubber, with at least 5% of beta-naphthol and at least one catalyst selected from the group consisting of sulfuric acid, halogen sulfonic acids, organic sulfonic acids, alkyl sulfates, boron trifluoride and dihydroxy fluoboric acid, the amount of the catalyst being from about 2% to about 50% of the beta-naphthol, and causing the beta-naphthol to react with the rubber to form a thermoplastic material by heating the mixture.

6. The method which comprises admixing solid unvulcanized rubber, having the normal characteristics of natural rubber, with at least 5% of a monohydric phenol free of substituents other than hydrogen, halogens and hydrocarbon radicals and having at least one position adjacent to the hydroxyl group unsubstituted, and with sulfuric acid, the amount of the sulfuric acid being from about 2% to about 50% of the phenol, and causing the phenol to react with the rubber to form a thermoplastic material by heating the mixture.

7. The method which comprises admixing solid unvulcanized rubber, having the normal characteristics of natural rubber, with at least 5% of a monohydric phenol free of substituents other than hydrocarbon radicals and having at least one position adjacent to the hydroxyl group unsubstituted, and with sulfuric acid, the amount of the sulfuric acid being from about 2% to about 50% of the phenol, and causing the phenol to react with the rubber to form a thermoplastic material by heating the mixture.

8. The method which comprises admixing solid unvulcanized rubber, having the normal characteristics of natural rubber, with at least 5% of an unsubstituted monohydric naphthol and with sulfuric acid, the amount of the sulfuric acid being from about 2% to about 50% of the naphthol, and causing the naphthol to react with the rubber to form a thermoplastic material by heating the mixture.

9. The method which comprises admixing solid unvulcanized rubber, having the normal characteristics of natural rubber, with at least 5% of beta-naphthol and with sulfuric acid, the amount of the sulfuric acid being from about 2% to about 50% of the beta-naphthol, and causing the beta-naphthol to react with the rubber to form a thermoplastic material by heating the mixture.

10. The method which comprises admixing solid unvulcanized rubber, having the normal characteristics of natural rubber, with at least 5% of a monohydric phenol free of substituents other than hydrogen, halogens and hydrocarbon radicals and having at least one position adjacent to the hydroxyl group unsubstituted, and with a catalyst mixture of sulfuric acid and diethyl sulfate, the amount of said catalyst mixture being from about 2% to about 50% of the phenol, and causing the phenol to react with the rubber to form a thermoplastic material by heating the mixture.

11. The method which comprises admixing solid unvulcanized rubber, having the normal characteristics of natural rubber, with at least 5% of a monohydric phenol free of substituents other than hydrogen, halogens and hydrocarbon radicals, and with at least one catalyst selected from the group consisting of sulfuric acid, halogen sulfonic acids, organic sulfonic acids, alkyl sulfates, boron trifluoride and dihydroxy fluoboric acid, the amount of the catalyst being from about 2% to about 50% of the phenol, causing the phenol to react with the rubber to form a thermoplastic material by heating the mixture, then treating the reaction product with sufficient amount of an aldehyde to react with any free phenol in the reaction product and heating to cause the aldehyde to react with the free phenol.

12. The method which comprises admixing solid unvulcanized rubber, having the normal characteristics of natural rubber, with at least 5% of a monohydric phenol free of substituents other than hydrogen, halogens and hydrocarbon radicals and having at least one position adjacent to the hydroxyl group unsubstituted, and with at least one catalyst selected from the group consisting of sulfuric acid, halogen sulfonic acids, organic sulfonic acids, alkyl sulfates, boron trifluoride and dihydroxy fluoboric acid, the amount of the catalyst being from about 2% to about 50% of the phenol, causing the phenol to react with the rubber to form a thermoplastic material by heating the mixture, then treating the reaction product with sufficient amount of an aldehyde to react with any free phenol in the reaction product and heating to cause the aldehyde to react with the free phenol.

13. The method which comprises admixing solid unvulcanized rubber, having the normal characteristics of natural rubber, with at least 5% of a monohydric phenol free of substituents other than hydrogen, halogens and hydrocarbon radicals, and with at least one catalyst selected from the group consisting of sulfuric acid, halogen sulfonic acids, organic sulfonic acids, alkyl sulfates, boron trifluoride and dihydroxy fluoboric acid, the amount of the catalyst being from about 2% to about 50% of the phenol, causing the phenol to react with the rubber to form a thermoplastic material by heating the mixture, then heating the reaction product with sufficient amount of formaldehyde to react with any free phenol in the reaction product and heating to cause the formaldehyde to react with the free phenol.

14. The method which comprises admixing solid unvulcanized rubber, having the normal characteristics of natural rubber, with at least 5% of an unsubstituted monohydric naphthol and with at least one catalyst selected from the group consisting of sulfuric acid, halogen sulfonic acids, organic sulfonic acids, alkyl sulfates, boron trifluoride and trihydroxy fluoboric acid, the amount of the catalyst being from about 2% to about 50% of the naphthol, and causing the naphthol to react with the rubber to form a thermoplastic material by heating the mixture, then treating the reaction product with sufficient amount of an aldehyde to react with any free naphthol in the reaction product and heating to cause the aldehyde to react with the free naphthol.

15. The method which comprises admixing solid unvulcanized rubber, having the normal characteristics of natural rubber, with at least 5% of an unsubstituted monohydric naphthol and with at least one catalyst selected from the group consisting of sulfuric acid, halogen sulfonic acids, organic sulfonic acids, alkyl sulfates, boron trifluoride and trihydroxy fluoboric acid, the amount of the catalyst being from about 2% to about 50% of the naphthol, and causing the naphthol to react with the rubber to form a thermoplastic material by heating the mixture, then treating the reaction product with sufficient amount of tri-oxy-methylene to react with any free naphthol in the reaction product and heating to cause the tri-oxy-methylene to react with the free naphthol.

16. A thermoplastic material having substantially no tendency to adhere to unvulcanized rubber and which is substantially identical with the product of the method of claim 1.

17. A thermoplastic material having substantially no tendency to adhere to unvulcanized rubber and which is substantially identical with the product of the method of claim 2.

18. A thermoplastic material having substantially no tendency to adhere to unvulcanized rubber and which is substantially identical with the product of the method of claim 3.

19. A thermoplastic material having substantially no tendency to adhere to unvulcanized rubber and which is substantially identical with the product of the method of claim 4.

20. A thermoplastic material having substantially no tendency to adhere to unvulcanized rubber and which is substantially identical with the product of the method of claim 5.

21. A thermoplastic material having substantially no tendency to adhere to unvulcanized rubber and which is substantially identical with the product of the method of claim 11.

22. A thermoplastic material having substantially no tendency to adhere to unvulcanized rubber and which is substantially identical with the product of the method of claim 14.

23. A thermoplastic material having substantially no tendency to adhere to unvulcanized rubber and which is substantially identical with the product of the method of claim 15.

IRA WILLIAMS.